(12) United States Patent
Kishine et al.

(10) Patent No.: US 8,598,290 B2
(45) Date of Patent: *Dec. 3, 2013

(54) METHOD FOR PRODUCING FLUORINE-CONTAINING ELASTOMER

(75) Inventors: Mitsuru Kishine, Settsu (JP); Masanori Kitaichi, Settsu (JP); Yousuke Nishimura, Settsu (JP); Manabu Fujisawa, Settsu (JP); Yoshiki Tanaka, Settsu (JP); Shintarou Ogata, Settsu (JP); Yutaka Ueta, Settsu (JP); Shigeru Morita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 314 days.

This patent is subject to a terminal disclaimer.

(21) Appl. No.: 12/307,022

(22) PCT Filed: Jun. 29, 2007

(86) PCT No.: PCT/JP2007/063136
§ 371 (c)(1),
(2), (4) Date: Dec. 30, 2008

(87) PCT Pub. No.: WO2008/001895
PCT Pub. Date: Jan. 3, 2008

(65) Prior Publication Data
US 2009/0234086 A1    Sep. 17, 2009

(30) Foreign Application Priority Data

Jun. 30, 2006 (JP) .................................. 2006-182750
Oct. 27, 2006 (JP) .................................. 2006-293189

(51) Int. Cl.
*C08F 14/18* (2006.01)

(52) U.S. Cl.
USPC ........... 526/243; 526/242; 526/247; 526/248; 524/773; 524/777; 524/805

(58) Field of Classification Search
USPC ........... 524/773, 777, 805; 526/242, 243, 247
See application file for complete search history.

(56) References Cited

U.S. PATENT DOCUMENTS

| | | | | |
|---|---|---|---|---|
| 5,804,650 A | * | 9/1998 | Tsuda et al. | 524/805 |
| 2002/0037985 A1 | * | 3/2002 | Lyons et al. | 526/247 |
| 2006/0047084 A1 | * | 3/2006 | Funaki et al. | 525/326.2 |
| 2007/0015857 A1 | * | 1/2007 | Hoshikawa et al. | 524/341 |
| 2007/0149733 A1 | | 6/2007 | Otsuka et al. | |
| 2007/0208131 A1 | | 9/2007 | Tsuda et al. | |
| 2008/0114118 A1 | | 5/2008 | Tsuda et al. | |
| 2008/0227948 A1 | | 9/2008 | Tsuda et al. | |

FOREIGN PATENT DOCUMENTS

| | | | |
|---|---|---|---|
| EP | 0779335 | A1 | 6/1997 |
| EP | 1736487 | A1 | 12/2006 |
| GB | 823974 | * | 11/1959 |
| JP | 58034814 | A | 3/1983 |
| JP | 08-067795 | A | 3/1996 |
| JP | 08-67795 | A | 3/1996 |
| JP | 09-194829 | A | 7/1997 |
| WO | 2005/063827 | A1 | 7/2005 |
| WO | 2005/097835 | A1 | 10/2005 |
| WO | 2005/097836 | A1 | 10/2005 |
| WO | 2005/097846 | A1 | 10/2005 |

* cited by examiner

*Primary Examiner* — Nicole M Buie-Hatcher
(74) *Attorney, Agent, or Firm* — Sughrue Mion, PLLC

(57) ABSTRACT

The present invention provides a method of producing a fluoroelastomer excellent in dispersion stability at low cost, at a high rate of polymerization and in high yields. The present invention is a method of producing a fluoroelastomer comprising an emulsion polymerization of a fluorinated monomer in the presence of a water-soluble radical polymerization initiator, wherein the emulsion polymerization is carried out in the presence of a compound (1) containing a functional group reactive in radical polymerization and a hydrophilic group and a fluorinated compound (2) containing a fluorocarbon group comprising 1 to 6 continuously united carbon atom with fluorine atom directly bound to each of them as well as a hydrophilic group.

4 Claims, No Drawings

METHOD FOR PRODUCING FLUORINE-CONTAINING ELASTOMER

TECHNICAL FIELD

The present invention relates to a method of producing a fluoroelastomer.

BACKGROUND ART

A known method of producing a fluoropolymer comprises carrying out emulsion polymerization in the presence of a fluorinated emulsifier.

In this emulsion polymerization, the fluorinated emulsifier produces the following two main effects: (1) increasing a yield of emulsified particles and increasing a rate of polymerization and (2) stabilizing the emulsified particles.

However, those fluorinated emulsifiers in general use have a fluoroalkyl group containing 7 or more carbon atom and, therefore, a problem arises, namely they are difficult to remove from a fluoropolymer obtained. Accordingly, investigations have been made in search of an emulsion polymerization method by which such problem can be solved.

In recent years, compounds having a radical-polymerizable reactive unsaturated bond and a hydrophilic group, namely the so-called reactive emulsifiers, have been proposed as emulsifiers substitutive for fluorinated emulsifiers (cf. e.g. Patent Document 1: Japanese Kokai Publication H08-67795).

Among the proposals so far offered for polymerization using a reactive emulsifier, there are, for example, emulsion polymerization to be carried out in the presence of a fluorinated, vinyl group-containing emulsifier and a chain transfer agent (cf. e.g. Patent Document 2: International Publication WO 05/097835), the method comprising carrying out a first polymerization step using a water-soluble radical polymerization initiator and a second polymerization step using an oil-soluble radical polymerization initiator, both in the presence of a fluorinated, vinyl group-containing emulsifier (cf. e.g. Patent Document 3: International Publication WO 05/097836), and emulsion polymerization to be carried out in the presence of a fluorinated, vinyl group-containing emulsifier and a bromine atom- and/or iodine atom-containing saturated aliphatic compound (cf. e.g. Patent Document 4: International Publication WO 05/097846).

Reactive emulsifiers are copolymerized by the action of the radical-polymerizable reactive unsaturated bond and, therefore, even when they are used in small amounts, a large number of emulsified particles can be obtained and they have an advantage in that they will "not remain as emulsifiers". However, reactive emulsifiers are consumed and introduced into a fluoropolymer during a polymerization reaction and, if they are added singly in amounts necessary for maintaining a dispersion stability of dispersions produced, they may possibly impair the characteristics of the fluoropolymer.

An emulsion polymerization method to be carried out in the presence of a hydrocarbon-based emulsifier in lieu of a fluorinated emulsifier has also been proposed (cf. e.g. Patent Document 5: International Publication WO 05/063827). This hydrocarbon-based emulsifier can give an increased number of emulsified particles but cannot stabilize an emulsion to a satisfactory extent in some instances.

DISCLOSURE OF INVENTION

Problems which the Invention is to Solve

In view of the problems discussed above, it is an object of the present invention to provide a method by which such problems as mentioned above can be solved and which can produce a fluoroelastomer excellent in dispersion stability at low cost, at a high rate of polymerization and in high yields.

Means for Solving the Problems

The present invention is a method of producing a fluoroelastomer comprising an emulsion polymerization of a fluorinated monomer in the presence of a water-soluble radical polymerization initiator, wherein the emulsion polymerization is carried out in the presence of a compound (1) containing a functional group reactive in radical polymerization and a hydrophilic group and a fluorinated compound (2) containing a fluorocarbon group comprising 1 to 6 continuously united carbon atom with fluorine atom directly bound to each of them as well as a hydrophilic group.

In the following, the present invention is described in detail.

According to the method of producing a fluoroelastomer in accordance with the invention, the emulsion polymerization is carried out in the presence of a compound (1) containing a functional group reactive in radical polymerization and a hydrophilic group and a fluorinated compound (2) containing a fluorocarbon group comprising 1 to 6 continuously united carbon atom with fluorine atom directly bound to each of them as well as a hydrophilic group.

The compound (1) mentioned above has emulsifying activity and therefore makes it possible to carry out emulsion polymerization even in the absence of any of a fluorinated surfactant in conventional use and, furthermore, it has a functional group reactive in radical polymerization and can improve a rate of polymerization and a yield of polymer. However, the above compound (1) is readily copolymerized with a fluorinated monomer on an occasion of emulsion polymerization and, when it is used in emulsion polymerization, the content thereof in the emulsion produced becomes lower than that at the time of start of polymerization and, as a result, a dispersion stability tends to decrease. When emulsion polymerization is carried out in the presence of an increased amount of the compound (1) to solve this problem and maintain the dispersion stability, the compound (1)—derived comonomer unit content increases, leading to a problem of formation of a fluoroelastomer inferior in physical properties, for example in curability.

On the other hand, the above-mentioned fluorinated compound (2) is not so high in emulsified particle forming effect in emulsion polymerization but shows a dispersion stability-maintaining effect; in addition, it is highly soluble in water, hence can be washed away with ease.

In accordance with the method of producing a fluoroelastomer according to the invention, a combined use of the compound (1), which can improve the rate of polymerization and the yield of polymer, and the fluorinated compound (2), which serves to maintain the dispersion stability, makes it possible to carry out the emulsion polymerization at a satisfactory polymerization rate and with a satisfactory polymer yield without using the compound (1) in large amounts to thereby obtain a fluoroelastomer having a low impurity content and excellent in physical properties such as curability.

The above-mentioned compound (1) contains a functional group reactive in radical polymerization and a hydrophilic group.

As the hydrophilic group in the above compound (1), there may be mentioned, for example, $-NH_2$, $-PO_3M$, $-OPO_3M$, $-SO_3M$, $-OSO_3M$ and $-COOM$ (in each formula, M representing H, $NH_4$ or an alkali metal). Among them, $-SO_3M$ and $-COOM$ are preferred as the hydrophilic group.

As the "functional group reactive in radical polymerization" in the above compound (1), there may be mentioned, for example, unsaturated bond-containing groups such as vinyl and allyl as well as groups showing chain transfer effect.

Preferred as the groups showing chain transfer effect are groups containing a methine hydrogen atom on carbon atom in a position α to the hydrophilic group, for example groups represented by $-R^a-CHY-R^b-$ (in which $R^a$ and $R^b$ each represents a hydrocarbon group which may be substituted; and Y represents the hydrophilic group.

Since it has a functional group reactive in radical polymerization, the above compound (1), when used in the emulsion polymerization mentioned above, reacts with a fluorinated monomer(s) at an initial stage of polymerization, whereby highly reactive particles having the compound (1)—derived hydrophilic group are formed. Thus, when emulsion polymerization is carried out in a presence of the above compound (1), the number of emulsified particles increases. The above-mentioned emulsion polymerization may be carried out in a presence of one single species of the above compound (1) or two or more compound (1) species.

In the above emulsion polymerization, the compound (1) to be used may be a compound containing an unsaturated bond, a compound having chain transfer effect, or the like.

As the unsaturated bond-containing compound among the compounds (1), there may be mentioned compounds represented by one of the formulas (1a)-(1e) given below.

Perfluorovinylalkyl compounds represented by

$$CF_2=CF-(CF_2)_{n1}-Y^1 \quad (1a)$$

(wherein $n_1$ represents an integer of 1 to 10 and $Y^1$ represents $-SO_3M^1$ or $-COOM^1$; $M^1$ represents H, $NH_4$ or an alkali metal).

In the above formula (1a), the integer $n_1$ is preferably not larger than 5, more preferably not larger than 2, and $Y^1$ is preferably $-COOM^1$ so that an adequate extent of solubility in water and of surface activity may be obtained. $M^1$ is preferably H or $NH_4$ since it hardly remains as an impurity and a heat resistance of a molding obtained is improved then.

Perfluorovinylalkyl compounds represented by

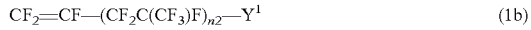

$$CF_2=CF-(CF_2C(CF_3)F)_{n2}-Y^1 \quad (1b)$$

(wherein $n_2$ represents an integer of 1 to 5 and $Y^1$ is as defined above).

In the above formula (1b), the integer $n_2$ is preferably not larger than 3 from an emulsifying ability viewpoint, and $Y^1$ is preferably $-COOM^1$ so that an adequate extent of solubility in water and of surface activity may be obtained. $M^1$ is preferably H or $NH_4$ since it hardly remains as an impurity and the heat resistance of a molding obtained is improved then.

Perfluorovinyl ether compounds represented by

$$CF_2=CF-O-(CFX^1)_{n3}-Y^1 \quad (1c)$$

(wherein $X^1$ represents F or $CF_3$, $n_3$ represents an integer of 1 to 10 and $Y^1$ is as defined above).

In the above formula (1c), the integer $n_3$ is preferably not larger than 5 from a water solubility viewpoint, and $Y^1$ is preferably $-COOM^1$ so that an adequate extent of solubility in water and of surface activity may be obtained. $M^1$ is preferably H or $NH_4$ from the improved dispersion stability viewpoint.

Perfluorovinyl ether compounds represented by

$$CF_2=CF-O-(CF_2CFX^1O)_{n4}-CF_2CF_2-Y^1 \quad (1d)$$

(wherein $n_4$ represents an integer of 1 to 10 and $Y^1$ and $X^1$ are as defined above).

In the above formula (1d), $X^1$ is preferably $-CF_3$ from the surface activity viewpoint, the integer $n_4$ is preferably not larger than 5 from a water solubility viewpoint, and $Y^1$ is preferably $-COOM^1$ so that an adequate extent of solubility in water and of surface activity may be obtained. $M^1$ is preferably H or $NH_4$.

Perfluoroallyl ether compounds represented by

$$CX^2{}_2=CFCF_2-O-(CF(CF_3)CF_2O)_{n5}-CF(CF_3)-Y^1 \quad (1e)$$

(wherein the two atoms of $X^2$ are the same and each represents F or H, $n_5$ represents an integer 0 or 1 to 10 and $Y^1$ is as defined above).

In the above formula (1e), the integer $n_5$ is preferably 0 or 1 to 5, more preferably 0 to 2, still more preferably 0 or 1, from the emulsifying ability viewpoint. $Y^1$ is preferably $-COOM^1$ so that an adequate extent of solubility in water and of surface activity may be obtained. $M^1$ is preferably H or $NH_4$ since it hardly remains as an impurity and the heat resistance of a molding obtained is improved then.

As the compound having chain transfer effect among the compounds (1), there may be mentioned compounds represented by the following formula (1f).

$$R^1-CR^2Y^2-R^3 \quad (1f)$$

(wherein $R^1$ and $R^3$ are the same or different and each represents an alkyl group containing 1 to 14 carbon atom, which has a straight or branched chain and may contain one ester bond; when neither of them contains any ester bond, a sum of the number of carbon atoms in $R^1$ and the number of carbon atom in $R^3$ is 13 to 16 and, when one of $R^1$ and $R^3$ contains an ester bond, the other also contains an ester bond; $R^2$ is H or $-CH_3$, and $Y^2$ represents a hydrophilic group).

In the above formula (1f), $R^1$ is preferably an alkyl group containing 1 to 13 carbon atom, $R^2$ is preferably H, and $R^3$ is preferably an alkyl group containing 1 to 13 carbon atom. The group $Y^2$ is preferably $-SO_3M^2$ or $-COOM^2$, and $M^2$ is preferably H or $-NH_4$.

Preferred as the above-mentioned compound (1) are compounds represented by the general formula (1g):

$$R^4-CHY^3-R^5 \quad (1g)$$

(wherein $R^4$ and $R^5$ each is an alkyl group containing 1 to 14 carbon atom which has a straight or branched chain, provided that a sum of the number of carbon atoms in $R^4$ and the number of carbon atom in $R^5$ is 13 to 16; and $Y^3$ represents a hydrophilic group) or compounds represented by the general formula (1h):

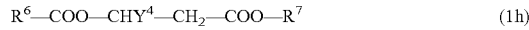

$$R^6-COO-CHY^4-CH_2-COO-R^7 \quad (1h)$$

(wherein $R^6$ and $R^7$ each is an alkyl group containing 5 to 10 carbon atom which has a straight or branched chain; and $Y^4$ represents a hydrophilic group).

In the above formula (1g), $R^4$ and $R^5$ each is preferably an alkyl containing 1 to 3 carbon atom.

As a compound represented by the above formula (1g), there may be mentioned, for example, Hostapur SAS93 (product of Clariant Japan, secondary alkane-sulfonate salt).

As the above-mentioned sulfosuccinic acid dialkyl ester salt, there may be mentioned dioctyl sulfosuccinate salts and, among them, sodium dioctyl sulfosuccinate is preferred.

In the above formula (1h), $R^6$ and $R^7$ each is preferably an alkyl group containing 6 to 8 carbon atom, more preferably 2-ethylhexyl.

In the above emulsion polymerization, the compound (1) is preferably used in an amount corresponding to 1 to 200 ppm of an aqueous medium.

When the above compound (1) is used in an amount lower than a level corresponding to 1 ppm of the aqueous medium, that portion of the product fluoroelastomer which adheres to the reaction vessel tends to increase, resulting in a reduction in productivity and, at levels exceeding an amount corresponding to 200 ppm of the aqueous medium, the fluoroelastomer obtained may show reductions in curability and strength, among others.

A more preferred lower limit to the level of addition of the above compound (1) is an amount corresponding to 10 ppm of the aqueous medium, a still more preferred lower limit thereto is an amount corresponding to 50 ppm of the aqueous medium, a more preferred upper limit thereto is an amount corresponding to 150 ppm of the aqueous medium, and a still more preferred upper limit thereto is an amount corresponding 100 ppm of the aqueous medium.

In accordance with the present invention, the emulsion polymerization is carried out in the presence of a fluorinated compound (2) containing a hydrophilic group and a fluorocarbon group comprising 1 to 6 continuously united carbon atom with fluorine atom directly bound thereto in addition to the compound (1) mentioned above.

The hydrophilic group in the above-mentioned fluorinated compound (2) is the same as described above referring to the above-mentioned compound (1).

The phraseology "1 to 6 continuously united carbon atom with fluorine atom directly bound to each of them" means the following.

The phraseology "carbon atom with fluorine atom directly bound to each of them" means that each carbon atom is bound to fluorine atom and thus occurs in the form of —$CF_3$ carbon, —$CF_2$ carbon, —CFH carbon or —CFR carbon (R being an alkyl group), for instance. The phraseology "1 to 6 continuously united" means that 1 to 6 such carbon atom occurs in the molecule in a consecutively bound form and that the molecule does not contain any unit comprising 7 or more consecutively bound such carbon atom. Thus, according to the present invention, a fluorinated compound that will not cause the problem of decreases in solubility in water as encountered with those compounds comprising 7 or more "continuously united carbon atom with fluorine atom directly bound to each of them" is selected as the fluorinated compound (2).

The above-mentioned structure comprising "1 to 6 continuously united carbon atom with fluorine atom directly bound to each of them" may appear twice or more times in one and the same molecule. The above-mentioned fluorinated compound (2) may contain two or more structures each comprising "1 to 6 continuously united carbon atom with fluorine atom directly bound to each of them" via a constituent unit other than such structure, for example in a case of —$Rf^{aa}$—O—$Rf^{as}$—, —$Rf^{aa}$—Rh—$Rf^{bb}$— or $Rf^{aa}$—COO—$Rf^{bb}$ (wherein, in each formula, $Rf^{aa}$, $Rf^{as}$ and $Rf^{bb}$ each represents an optional fluorocarbon group having the structure defined above and Rh represents an any alkenyl group).

In carrying out the emulsion polymerization, one single species of the above-mentioned fluorine compound (2) may be caused to exist or two or more species thereof may be caused to exist.

As the fluorinated compound (2), there may be mentioned, for example, fluorocarboxylic acids represented by

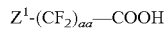

$Z^1\text{-}(CF_2)_{aa}\text{—COOH}$

[wherein $Z^1$ represents F, Cl or H and aa represents an integer of 1 to 6] as well as alkali metal salts, ammonium salts, amine salts and quaternary ammonium salts thereof; fluorocarboxylic acids represented by

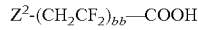

$Z^2\text{-}(CH_2CF_2)_{bb}\text{—COOH}$

[wherein $Z^2$ represents H, F or Cl and bb represents an integer of 1 to 2] as well alkali metal salts, ammonium salts, amine salts and quaternary ammonium salts thereof; and acidic compounds represented by

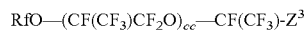

$RfO\text{—}(CF(CF_3)CF_2O)_{cc}\text{—}CF(CF_3)\text{-}Z^3$

[wherein $Rf$ represents a perfluoroalkyl group containing 1 to 6 carbon atom, cc represents an integer of 1 to 10 and $Z^3$ represents —COOM or —$SO_3M$; M represents H, $NH_4$ or an alkali metal].

The fluorinated compound (2) is preferably a fluorinated alkyl compound represented by the formula (2a):

$$CF_3\text{—}(CF_2)_{n7}\text{—}(CH_2)_{n8}\text{—}Y^5 \qquad (2a)$$

(wherein $n_7$ represents an integer of 1 to 5, $Y^5$ represents —$SO_3M^3$ or —$COOM^3$ and $n_8$ represents an integer of 0 to 4; $M^3$ represents H, $NH_4$ or an alkali metal).

In the above formula (2a), $n_7$ is preferably 4 or 5, $n_8$ is preferably 0 to 2, $Y^3$ is preferably-$COOM^3$, and $M^3$ is preferably H or $NH_4$.

As the above fluorinated alkyl compound, there may be mentioned, for example, $F(CF_2)_6CH_2CH_2SO_3NH_4$.

Preferred as the above-mentioned fluorinated compound (2a) is, in particular, perfluoroalkyl compounds represented by the formula (2b):

$$CF_3\text{—}(CF_2)_{n7}\text{—}Y^5 \qquad (2b)$$

(wherein $n_7$ represents an integer of 1 to 5 and $Y^5$ represents —$SO_3M^3$ or —$COOM^3$; $M^3$ represents H, $NH_4$ or an alkali metal).

In the above-mentioned emulsion polymerization, a species and amount of the above-mentioned fluorinated compound (2) can be properly selected according to an intended composition and yield of the fluoroelastomer to be produced and other factors. From the dispersion stability and washing points of view, the compound is preferably used in an amount corresponding to 200 to 5000 ppm of an aqueous medium. A more preferred lower limit to the amount of the above fluorinated compound (2) is at a level corresponding to 400 ppm of an aqueous medium, a still more preferred lower limit thereto is at a level corresponding to 800 ppm of the aqueous medium, a more preferred upper limit thereto is at a level corresponding to 4000 ppm of the aqueous medium, and a still more preferred upper limit thereto is at a level corresponding to 2000 ppm of an aqueous medium.

In carrying out an emulsion polymerization in a practice of the invention, a perfluoroallyl ether compound represented by the formula (1e) given hereinabove and a perfluoroalkyl compound represented by the formula (2b) are preferably used as the above-mentioned compound (1) and compound (2), respectively. The use of $CH_2\!=\!CFCF_2OCF(CF_3)CF_2OCF(CF_3)COONH_4$ and $F(CF_2)_5COONH_4$ is more preferred.

The emulsion polymerization in the practice of the invention can also be carried out by adding such an additive as a chain transfer agent so long as it is carried out in the presence of the above-mentioned compound (1) and the above-mentioned fluorinated compound (2).

When the above emulsion polymerization is carried out in the presence of a chain transfer agent, for instance, the molecular weight and molecular weight distribution of the fluoroelastomer to be obtained can be adjusted.

The above-mentioned chain transfer agent is not particularly restricted but may be any one that has no hydrophilic group. Thus, mention may be made of saturated hydrocarbons containing 1 to 6 carbon atom, ketones containing 3 to 5 carbon atom, mercaptans containing 10 to 12 carbon atom and malonic acid esters such as diethyl malonate.

Preferred as the chain transfer agent are saturated hydrocarbons containing 1 to 6 carbon atom and, among them, iodine- and fluorine-substituted ones are more preferred.

The method of producing a fluoroelastomer according to the invention comprises carrying out the emulsion polymerization of a fluorinated monomer by adding a water-soluble radical polymerization initiator.

The fluoroelastomer may be any noncrystalline fluoropolymer having rubber elasticity.

The above-mentioned fluoroelastomer is a polymer having fluorine atom content of at least 58% by mass, preferably at least 64% by mass, but not higher than 74% by mass; it may be a partially fluorinated polymer or a perfluoropolymer.

The above-mentioned fluoroelastomer preferably has a glass transition temperature (Tg) of not higher than room temperature (25° C.). More preferably, the above-mentioned glass transition temperature is not higher than 5° C.

The glass transition temperature (Tg), so referred to herein, is measured by using a DSC (Seiko Denshi Kogyo model RDC 220) and calculating a mean for the lower temperature side and higher temperature side of an endothermic inflection point.

The above-mentioned fluoroelastomer contains 30 to 80% by mass of primary monomer-derived comonomer units.

The term "primary monomer" as used herein means a monomer constituting a comonomer units accounting for a majority of the mass of all comonomer units in the molecular structure of the fluoroelastomer. As the primary monomer, there may be mentioned, for example, vinylidene fluoride [VDF], tetrafluoroethylene [TFE], perfluoro(alkyl vinyl ether) [PAVE] species and hexafluoropropylene [HFP].

Each of the comonomer units so referred to herein means that part of a molecular structure of the fluoroelastomer which is derived from a corresponding monomer. For example, the VDF unit is that part of a molecular structure of a VDF-based copolymer which is derived from VDF; it is represented by —(CH$_2$—CF$_2$)—. The "all comonomer units" are all monomer-derived moieties constituting a molecular structure of the fluoroelastomer.

A contents of the comonomer units mentioned above are obtained by F$^{19}$-NMR measurements.

In the above-mentioned fluoroelastomer, a comonomer units other than those derived from the primary monomer may be derived from one single monomer species copolymerizable with the above-mentioned primary monomer or from two or more monomer species copolymerizable with the primary monomer.

The monomer copolymerizable with the above-mentioned primary monomer may be, for example, a fluorinated olefin, a fluorinated vinyl ether or a hydrocarbon olefin.

The above-mentioned fluorinated olefin is not particularly restricted but includes, for example, hexafluoropropylene [HFP], 1,2,3,3,3-pentafluoropropene [1-HPFP], chlorotrifluoroethylene [CTFE] and vinyl fluoride [VF], among others.

The above-mentioned fluorinated vinyl ether is preferably a perfluoro(vinyl ether).

As the above-mentioned perfluoro(vinyl ether), there may be mentioned, for example, compounds represented by the formula CF$_2$=CFO(Rf$^a$O)$_n$(Rf$^b$O)$_m$Rf$^c$ [wherein Rf$^a$ and Rf$^b$ are different and each is a straight or branched perfluoroalkylene group containing 2 to 6 carbon atom, m and n each independently is an integer of 0 to 10 and Rf$^c$ is a perfluoroalkyl group containing 1 to 6 carbon atom] and compounds represented by the formula CF$_2$=CFO(CF$_2$CFXO)$_r$Rf$^d$ [wherein X is —F or —CF$_3$, r is an integer of 0 to 5 and Rf$^d$ is a perfluoroalkyl group containing 1 to 6 carbon atom], among others.

Preferred as the above-mentioned perfluoro(vinyl ether) are compounds represented by the formula (1) CF$_2$=CFO[(CF$_2$CF(CF$_3$)O)$_m$(CF$_2$CF$_2$CF$_2$O)$_n$(CF$_2$)$_y$]C$_z$F$_{2z+1}$ [wherein m and n each independently is an integer of 0 to 10, y is an integer of 0 to 3 and z (number of carbon atoms) is an integer of 1 to 5], compounds represented by the formula (ii) CF$_2$=CFOCF$_2$CF(CF$_3$)O(CF$_3$O)$_w$C$_x$F$_{2x+1}$ [wherein w is an integer of 1 to 5 and x is an integer of 1 to 3] and compounds represented by the formula (iii) CF$_2$=CFO[(CF$_2$)$_u$CF$_2$CFZ$^1$O]$_v$Rf$^e$ [wherein Rf$^e$ is a perfluoroalkyl group containing 1 to 6 carbon atom, u is a integer 0 or 1, v is an integer of 0 to 5 and Z$^1$ is —F or —CF$_3$]. In the above formula (1), m and n each independently is preferably a integer 0 or 1 and z is preferably a integer 1.

In the above formula (ii), x is preferably a integer 1.

In the above formula (iii), the group Rf$^e$ is preferably C$_3$F$_7$, u is preferably a integer 0 and v is preferably a integer 1.

The above-mentioned perfluoro(vinyl ether) is further preferably a perfluoro(alkyl vinyl ether) [PAVE]. As the PAVE, there may be mentioned, for example, perfluoro(methyl vinyl ether) [PMVE], perfluoro(ethyl vinyl ether) [PEVE] and perfluoro(propyl vinyl ether) [PPVE].

When the above-mentioned fluoroelastomer contains perfluoro(vinyl ether) units, a content of the perfluoro(vinyl ether) units is preferably 20 to 70% by mass.

When the above-mentioned fluoroelastomer contains PMVE units, a content of the PMVE units is preferably 30 to 55% by mass.

The above-mentioned hydrocarbon olefin is not particularly restricted but is, for example, ethylene, propene or the like, and propene is preferred.

When the above-mentioned fluoroelastomer contains hydrocarbon olefin units, a content of the hydrocarbon olefin units is preferably 4 to 20% by mass.

As the above-mentioned fluoroelastomer, there may be mentioned, for example, TFE-based copolymers such as TFE/perfluoro(alkyl vinyl ether) type copolymers, TFE/perfluoro(alkoxy vinyl ether) type copolymers, TFE/propylene type copolymers and TFE/propylene/VDF type copolymers; VDF-based copolymers such as VDF/HFP copolymers, VDF/CTFE type copolymers, VDF/CTFE/TFE type copolymers, VDF/HFP/TFE copolymers, VDF/HFP/TFE/4-bromo-3,3,4,4-tetrafluorobutene-1 copolymers, VDF/HFP/TFE/4-iodo-3,3,4,4-tetrafluorobutene-1 copolymers, VDF/PMVE/TFE/4-bromo-3,3,4,4-tetrafluorobutene-1 copolymers, VDF/PMVE/TFE/4-iodo-3,3,4,4-tetrafluorobutene-1 copolymers and VDF/PMVE/TFE/1,1,3,3,3-pentafluoropropene copolymers; ethylene/HFP type copolymers and like fluorocopolymers.

As the above-mentioned TFE/propylene type copolymers, there may be mentioned TFE/propylene copolymers, among others.

As the above-mentioned TFE/perfluoro(vinyl ether) type copolymers, there may be mentioned TFE/PAVE copolymers such as TFE/PMVE copolymers, TFE/PEVE copolymers, TFE/PPVE copolymers, TFE/[CF$_2$=CF—O—

$(CF_2CFCF_3O)_2$—$(CF_2)_2$—$CF_3$] copolymers, TFE/PMVE/ ethylene copolymers, TFE/PMVE/ethylene/4-bromo-3,3,4, 4-tetrafluorobutene-1 copolymers, TFE/PMVE/ethylene/4-iodo-3,3,4,4-tetrafluorobutene-1 copolymers, TFE/PMVE copolymers, TFE/PMVE/perfluoro(8-cyano-5-methyl-3,6-dioxa-1-octene) copolymers, TFE/PMVE/4-iodo-3,3,4,4-tetrafluorobutene-1-copolymers and TFE/PMVE/perfluoro(2-phenoxypropyl vinyl)ether copolymers, among others.

When the above-mentioned fluoroelastomer is a TFE/PAVE copolymer, the PAVE content is preferably 40 to 75% by mass.

When the above-mentioned fluoroelastomer is a perfluoroelastomer, it may contain a so-called cure site monomer, typically an iodine- or cyano group-containing perfluoro(vinyl ether), in a content range not exceeding 10 mole percent.

As the fluorinated monomer to be used in a practice of the invention, there may be mentioned the above-mentioned primary monomers and the fluorinated olefins, fluorinated vinyl ethers and hydrocarbon olefins enumerated hereinabove as examples of the monomers copolymerizable with the above-mentioned primary monomers.

Conventional as the water-soluble radical polymerization initiator to be used in a practice of the invention are water-soluble inorganic compound or water-soluble organic compound peroxides, for example persulfates such as ammonium persulfate and potassium persulfate, bissuccinoyl peroxide and bisglutaroyl peroxide; these may be used singly or two or more of them may used in combination. In a case of polymerization in a low temperature range, redox type initiators are preferably used. Furthermore, one or both of a water-insoluble organic peroxide and azo compound may also be used singly or in combination with a water-soluble inorganic compound or water-soluble organic compound peroxide so long as it or they will not impair a stability of a latex.

The level of addition of the above-mentioned water-soluble radical polymerization initiator can be properly selected according to a desired composition and yield of a product fluoroelastomer and an amounts of the above-mentioned fluorinated monomers and the like. The above-mentioned water-soluble radical polymerization initiator is preferably added in an amount of 0.01 to 0.4 part by mass, more preferably 0.05 to 0.3 part by mass, per 100 parts by mass of the fluoroelastomer to be obtained.

In a practice of the invention, the emulsion polymerization may be carried out according to any of a batchwise, semi-batchwise and continuous procedures. The semibatchwise procedure is preferred, however.

In the above emulsion polymerization, the fluorinated monomer, water-soluble radical polymerization initiator, compound (1) and fluorinated compound (2) mentioned above can be supplemented during a polymerization reaction according to a composition and yield of a desired fluoropolymer.

Furthermore, when the above emulsion polymerization is carried out according to a multistep polymerization procedure described in International Publication WO 00/001741, it is possible to cause the product fluoroelastomer to have a copolymer composition as desired.

The above emulsion polymerization is generally carried out while maintaining the temperature in the range of 10 to 120° C. When the temperature is lower than 10° C., the rate of reaction cannot be raised to an effective level for commercial scale production and, when it is higher than 120° C., the reaction pressure necessary for maintaining the polymerization reaction becomes high and the reaction cannot be maintained any longer.

The above emulsion polymerization is generally carried out while maintaining the pressure within a range of 0.5 to 10 MPa. A preferred lower limit to the pressure is 1.0 MPa, and a preferred upper limit thereto is 6.2 MPa.

When the pressure is lower than 0.5 MPa, the monomer concentration in the polymerization reaction system becomes excessively low, so that, in some instances, no satisfactory rate of reaction can be attained and a molecular weight of the fluoroelastomer molecules fails to arrive at a sufficiently high level. When the pressure is higher than 10 MPa, an equipment for pressure maintenance becomes expensive.

When the above emulsion polymerization is carried out in a semibatchwise manner, a desired polymerization pressure can be attained at the initial stage of polymerization by adjusting an amount of the monomer gas at the initial stage of feeding thereof and, after start of the reaction, the pressure is adjusted by adjusting an amount of the monomer gas to be further added.

When the above polymerization is carried out in a continuous manner, the polymerization pressure is adjusted by adjusting a back pressure in the outlet tube for an aqueous fluoroelastomer dispersion obtained.

The above polymerization is generally carried out for 0.5 to 100 hours.

The fluoroelastomer obtainable by carrying out the above emulsion polymerization, namely a so-called virgin fluoroelastomer, is obtained in an amount almost equal to an amount of the charge and is generally obtained in an amount of 10 to 30% by mass, preferably 20 to 25% by mass, of an aqueous dispersion obtained.

The fluoroelastomer virgin particles generally have an average particle diameter of 10 to 500 nm and are excellent in dispersion stability.

The fluoroelastomer virgin particles can generally amount to $1 \times 10^{13}$ particles/gram of water.

In preparing a fluoroelastomer by coagulating the above-mentioned virgin fluoroelastomer, further addition of a fluorinated compound (2) after the above emulsion polymerization can result in improved coagulability.

So long as it is obtained from the above-mentioned polymerization, a fluoroelastomer obtained by the method of producing a fluoroelastomer according to the invention may be in any form; it may be used in a form of an aqueous dispersion of a virgin fluoroelastomer or in a form of gums or crumbs obtained from an aqueous dispersion of the virgin fluoroelastomer by coagulation, drying and so forth in a conventional manner.

The gums mentioned above are small granular masses of a fluoroelastomer, and the crumbs mentioned above have indefinite massive forms resulting from mutual fusion bonding of small granular gums due to failure thereof to maintain the gum form at room temperature.

The above fluoroelastomer can be processed into a fluoroelastomer composition by adding a curing agent and/or a filler, for instance.

As the curing agent, there may be mentioned polyols, polyamines, organic peroxides, organotins, bis(aminophenol) tetraamines, bis(thioaminophenol) and so forth.

The above fluoroelastomer composition comprises the above-mentioned fluoroelastomer and therefore is advantageous in that it is substantially free of any conventional fluorinated emulsifier and can be readily crosslinked in a step of molding processing.

A Fluoroelastomer molding can be obtained by molding processing using the above fluoroelastomer. The method of such molding processing is not particularly restricted but may be a conventional method using the curing agent mentioned above.

The above-mentioned fluoroelastomer molding, which are made of the above-mentioned fluoroelastomer, are low in permanent compression set, excellent in mechanical strength, suited for use as seals, electric wire coverings, tubes and laminates, among others, and particularly suited for use as semiconductor manufacturing apparatus parts, automotive parts and the like.

Effects of the Invention

The method of producing a fluoroelastomer according to the invention, which has the constitution described hereinabove, can produce the fluoroelastomer excellent in dispersion stability at low cost, at a high rate of polymerization and in high yields.

BEST MODES FOR CARRYING OUT THE INVENTION

The following examples illustrate the invention more specifically. These examples are, however, by no means limitative of a scope of the invention.

In the examples and comparative examples, unless otherwise specified, the amounts of the compositions are given on a mass basis.

The characteristics measurement methods and evaluation methods used herein were as follows.

(1) Copolymer Composition

NMR measurements were carried out under the following conditions.

Measuring apparatus: product of Bruker Corp.
$^1$H-NMR measurement conditions: 300 MHz (tetramethylsilane=0 ppm)
$^{19}$F-NMR measurement conditions: 282 MHz (trichlorofluoromethane=0 ppm)

(2) Average particle diameter of fluoroelastomer (fluorocopolymer)

A sample was prepared by diluting 0.05 ml of the measurement target emulsion with 8 ml of pure water and the measurement was carried out using Microtrack UPA (product of Honeywell) at room temperature (dynamic light scattering method). The data obtained was recorded as an average particle diameter.

(3) Solid Matter Concentration

The dispersion obtained was dried at 120° C. for 2 hours, and the concentration was calculated from the loss in mass.

(4) Iodine Atom Content

The sample (10 mg) was converted to soot by a flask combustion method, the soot was dissolved in 20 cc of pure water and the solution was subjected to liquid chromatography (Hitachi model L-4000 chromatography column: Dionex IonPac AS4A-SC).

(5) Number of Particles

Assuming the specific gravity of the fluorocopolymer as 1.9, the number of particles was calculated based on the rubbery fluorocopolymer obtained and the average particle diameter of the fluorocopolymer in the form of a dispersion.

(6) Mooney Viscosity

The measurement was carried out according to JIS K 6300-1 using the apparatus Mooney viscometer MV2000 (product of Alpha Technologies).

(7) Curing Characteristics

The measurements were carried out using a JSR type V Curastometer.

(8) Mechanical Properties

The tensile strength, elongation and tensile stress were measured according to JIS K 6251. The permanent compression set value was measured using an O ring (P-24) according to JIS K 6262. A Shore hardness was measured according to JIS K 6253.

EXAMPLE 1

A 3-L stainless steel autoclave was charged with 0.99 L of pure water, 0.2 g of a 50% aqueous solution of $CH_2$=$CFCF_2CF(CF_3)OCF_2CF_2COONH_4$ (emulsifier A) and 1.54 g of a 50% aqueous solution of $F(CF_2)_5COONH_4$, and the system inside was sufficiently purged with nitrogen gas. After raising the temperature to 80° C. with stirring at 600 rpm, a monomer composition (initial monomer) consisting of vinylidene fluoride [VDF]/tetrafluoroethylene [TFE]/hexafluoropropylene [HFP] (=19/11/70 mole percent) was fed into the autoclave under pressure until arrival of the pressure at 1.52 MPa.

Then, a polymerization initiator solution prepared by dissolving 23.6 mg of ammonium persulfate [APS] in 5 ml of pure water was fed under nitrogen gas pressure to initiate the reaction.

With the progress of polymerization, the inside pressure fell to 1.42 MPa. At that time, a monomer mixture (succeeding monomer mixture) consisting of VDF/TFE/HFP (=51/20/29 mole percent) was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, the above-mentioned aqueous solution of APS (23.6 mg/5 ml of pure water) was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 22.6% by mass was obtained. The fluorocopolymer particles had an average particle diameter of 100 nm. The copolymer composition was examined by NMR analysis and found to be VDF/TFE/HFP=52/22/26 (mole percent), and the number of particles in the dispersion was $3.4 \times 10^{14}$ (particles/g of water). An attempt was made to recover the portion of the fluorocopolymer adhering to the autoclave inside but such portion was too small to be recovered. The amount of the fluorocopolymer adhering to the autoclave inside which is recovered serves as an indicator of a dispersion stability of the dispersion; the smaller the recovered amount is, the better the dispersion stability is.

The above dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.22% by mass, and the Mooney viscosity was $ML_{1+10}$ (100° C.)=53.

The above rubbery fluorocopolymer (100 phr) was kneaded with 20 phr of N990 (carbon black), 4 phr of TAIC and 1.5 phr of Perhexa 25B on a mixing roll mill to give a curable composition. The curing characteristics of the curable composition obtained and the physical characteristics of the curing product obtained by press curing and further oven curing were good, as shown in Table 3.

EXAMPLE 2

A 3-L stainless steel autoclave was charged with 0.99 L of pure water, 0.2 g of a 50% aqueous solution of emulsifier A and 1.072 g of a 50% aqueous solution of $F(CF_2)_3COONH_4$, and the system inside was sufficiently purged with nitrogen gas. After raising the temperature to 80° C. with stirring at 600 rpm, a monomer composition consisting of VDF/TFE/HFP=19/11/70 mole percent was fed into the autoclave under pressure until arrival of the pressure at 1.52 MPa. Then, a polymerization initiator solution prepared by dissolving 23.6 mg of APS in 5 ml of pure water was fed under nitrogen gas pressure to initiate the reaction.

With the progress of polymerization, the inside pressure fell to 1.42 MPa. At that time, a monomer mixture consisting of VDF/TFE/HFP=51/20/29 mole percent was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, an aqueous solution of 23.6 mg of APS in 5 ml of pure water was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 23.4% by mass was obtained. The fluorocopolymer particles had an average particle diameter of 129 nm. The copolymer composition was examined by NMR analysis and found to be VDF/TFE/HFP=52/22/26 (mole percent), and the number of particles in the dispersion was $1.7 \times 10^{14}$ (particles/g of water).

That portion of the fluorocopolymer adhering to the autoclave inside was recovered and dried at 120° C. for 8 hours; the residue weighed 2.4 g.

The above dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.20% by mass, and the Mooney viscosity was $ML_{1+10}$ (100° C.)=64.

The above rubbery fluorocopolymer (100 phr) was kneaded with 20 phr of N990, 4 phr of TAIC and 1.5 phr of Perhexa 25B on a mixing roll mill to give a curable composition. The curing characteristics of the curable composition obtained and the physical characteristics of the curing product obtained by press curing and further oven curing were good, as shown in Table 3.

EXAMPLE 3

A 3-L stainless steel autoclave was charged with 0.99 L of pure water, 0.2 g of a 50% aqueous solution of emulsifier (A) and 2.06 g of a 50% aqueous solution of $F(CF_2)_6CH_2CH_2SO_3NH_4$, and the system inside was sufficiently purged with nitrogen gas. After raising the temperature to 80° C. with stirring at 600 rpm, a monomer composition consisting of VDF/TFE/HFP=19/11/70 mole percent was fed into the autoclave under pressure until arrival of the pressure at 1.52 MPa. Then, a polymerization initiator solution prepared by dissolving 23.6 mg of APS in 5 ml of pure water was fed under nitrogen gas pressure to initiate the reaction.

With the progress of polymerization, the inside pressure fell to 1.42 MPa. At that time, a monomer mixture consisting of VDF/TFE/HFP=51/20/29 mole percent was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, an aqueous solution of 23.6 mg of APS in 5 ml of pure water was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 22.2% by mass was obtained. The fluorocopolymer particles had an average particle diameter of 117 nm. The copolymer composition was examined by NMR analysis and found to be VDF/TFE/HFP=53/23/24 (mole percent), and the number of particles in the dispersion was $2.3 \times 10^{14}$ (particles/g of water). An attempt was made to recover the portion of the fluorocopolymer adhering to the autoclave inside but such portion was too small to be recovered.

The above dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.26% by mass, and the Mooney viscosity was $ML_{1+10}$ (100° C.)=50.

The above rubbery fluorocopolymer (100 phr) was kneaded with 20 phr of N990, 4 phr of TAIC and 1.5 phr of Perhexa 25B on a mixing roll mill to give a curable composition. The curing characteristics of the curable composition obtained and the physical characteristics of the curing product obtained by press curing and further oven curing were good, as shown in Table 3.

EXAMPLE 4

A 3.14-L stainless steel autoclave was charged with 1.716 L of pure water, 0.0343 g of a 50% aqueous solution of emulsifier A and 1.386 g of a 50% aqueous solution of $F(CF_2)_5COONH_4$, and the system inside was sufficiently purged with nitrogen gas. After raising the temperature to 80° C. with stirring at 560 rpm, a monomer composition consisting of VDF/HFP=42/58 mole percent was fed into the autoclave under pressure until arrival of the pressure at 6 MPa.

Then, a polymerization initiator solution prepared by dissolving 0.257 g of APS in 5 ml of pure water was fed, together with 9.95 g of diethyl malonate, under nitrogen gas pressure to initiate the reaction.

With the progress of polymerization, the inside pressure began to fall. At that time, a monomer mixture consisting of VDF/HFP (=78/22 mole percent) was fed under pressure until arrival of the inside pressure at 6 MPa. After addition of a total of 470 g of the monomer mixture in that manner, the unreacted monomers were discharged, the autoclave was cooled, and a dispersion with a solid matter concentration of 27.1% by mass was obtained. The fluorocopolymer particles had an average particle diameter of 192 nm. The copolymer composition was examined by NMR analysis and found to be VDF/HFP=78/22 (mole percent), and the number of particles in the dispersion was $5.6 \times 10^{13}$ (particles/g of water). That portion of the fluorocopolymer adhering to the autoclave inside was recovered and dried at 120° C. for 8 hours; the residue weighed 3.6 g.

The above dispersion was subjected to coagulation by addition of a 4% (by mass) aqueous solution of aluminum sulfate. The coagula obtained were washed with water and dried to give a rubbery fluorocopolymer. The Mooney viscosity thereof was $ML_{1+10}$ (100° C.)=49.

The above rubbery fluorocopolymer (100 phr) was kneaded with 20 phr of N990, 2.17 phr of bisphenol AF, 0.43 phr of benzyltriphenylphosphonium chloride (BTPPC), 3 phr of magnesium oxide (MA-150) and 6 phr of calcium hydroxide (Caldic 2000) on a mixing roll mill to give a curable composition. The curing characteristics of the curable composition obtained and the physical characteristics of the curing product obtained by press curing and further oven curing were as shown in Table 3.

EXAMPLE 5

A 3.14-L stainless steel autoclave was charged with 1.716 L of pure water, 0.0343 g of a 50% aqueous solution of $CH_3(CH_2)_mCH(SO_3Na)(CH_2)_nCH_3$ (m+n=10 to 14) and 1.386 g of a 50% aqueous solution of $F(CF_2)_5COONH_4$, and the system inside was sufficiently purged with nitrogen gas. After raising the temperature to 80° C. with stirring at 560 rpm, a monomer composition consisting of VDF/HFP=42/58 mole percent was fed into the autoclave under pressure until arrival of the pressure at 6 MPa. Then, a polymerization initiator solution prepared by dissolving 0.257 g of APS in 5 ml of pure water was fed, together with 9.95 g of diethyl malonate, under nitrogen gas pressure to initiate the reaction.

With the progress of polymerization, the inside pressure began to fall. At that time, a monomer mixture consisting of VDF/HFP (=78/22 mole percent) was fed under pressure until arrival of the inside pressure at 6 MPa. After addition of a total of 470 g of the monomer mixture in that manner, the unreacted monomers were discharged, the autoclave was cooled, and a dispersion with a solid matter concentration of 26.1% by mass was obtained. The fluorocopolymer particles had an average particle diameter of 334 nm. The copolymer composition was examined by NMR analysis and found to be VDF/HFP=78/22 (mole percent), and the number of particles in the dispersion was $1.0 \times 10^{13}$ (particles/g of water). That portion of the fluorocopolymer adhering to the autoclave inside was recovered and dried at 120° C. for 8 hours; the residue weighed 3.7 g.

The above dispersion was subjected to coagulation by addition of a 4% (by mass) aqueous solution of aluminum sulfate. The coagula obtained were washed with water and dried to give a rubbery fluorocopolymer. The Mooney viscosity thereof was $ML_{1+10}$ (100° C.)=51.

The above rubbery fluorocopolymer (100 phr) was kneaded with 20 phr of N990, 2.17 phr of bisphenol AF, 0.43 phr of benzyltriphenylphosphonium chloride (BTPPC), 3 phr of magnesium oxide (MA-150) and 6 phr of calcium hydroxide (Caldic 2000) on a mixing roll mill to give a curable composition. The curing characteristics of the curable composition obtained and the physical characteristics of the curing product obtained by press curing and further oven curing were as shown in Table 3.

EXAMPLE 6

A 3-L stainless steel autoclave was charged with 1.48 L of pure water, 0.15 g of a 50% aqueous solution of emulsifier (A) and 6.0 g of a 50% aqueous solution of $F(CF_2)_5COONH_4$, and the system inside was sufficiently purged with nitrogen gas. After raising the temperature to 80° C. with stirring at 560 rpm, a monomer composition consisting of VDF/TFE/perfluoro(methyl vinyl ether) [PMVE]=64/8/28 mole percent was fed into the autoclave under pressure until arrival of the pressure at 1.52 MPa. Then, a polymerization initiator solution prepared by dissolving 22.5 mg of APS in 5 ml of pure water was fed under nitrogen gas pressure to initiate the reaction.

With the progress of polymerization, the inside pressure fell to 1.42 MPa. At that time, a monomer mixture consisting of VDF/TFE/PMVE=69/11/20 mole percent was fed under pressure until arrival of the inside pressure at 1.52 MPa. On that occasion, 1.616 g of a diiodinated compound, $I(CF_2)_4I$, was injected into the autoclave. Then, 3.312 g of an iodine-containing fluorinated vinyl ether, $CF_2=CFOCF_2CF_2CH_2I$, was injected into the autoclave. While such pressurization followed by pressure drop was repeated, an aqueous solution of 11.0 mg of APS in 5 ml of pure water was fed under nitrogen gas pressure at 3-hour intervals and the polymerization reaction was thus continued. After addition of a total of 540 g of the monomer mixture, the unreacted monomers were discharged, the autoclave was cooled, and a dispersion with a solid matter concentration of 26.2% by mass was obtained. The fluorocopolymer particles had an average particle diameter of 160 nm. The copolymer composition was examined by NMR analysis and found to be VDF/TFE/PMVE=67/14/19 (mole percent), and the number of particles in the dispersion was $9.2 \times 10^{13}$ (particles/g of water).

An attempt was made to recover the portion of the fluorocopolymer adhering to the autoclave inside but such portion was too small to be recovered. The above dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.33% by mass, and the Mooney viscosity was $ML_{1+10}$ (100° C.)=59.

The above rubbery fluorocopolymer (100 phr) was kneaded with 20 phr of N990, 3 phr of TAIC and 1.5 phr of Perhexa 25B on a mixing roll mill to give a curable composition. The curing characteristics of the curable composition obtained and the physical characteristics of the curing product obtained by press curing and further oven curing were good, as shown in Table 3.

EXAMPLE 7

A 3-L SUS stainless steel polymerization vessel was charged with 1530 ml of pure water and then with 0.153 g of a 50% (by mass) aqueous solution of $CH_2=CFCF_2OCF(CF_3)CF_2OCF(CF_3)COONH_4$ and 3.06 g of $C_5F_{11}COONH_4$, and the polymerization vessel was then evacuated, followed by substitution with nitrogen. Then, at 80° C., a mixed gas composed of VDF/HFP=65/35 mole percent was fed into the vessel until arrival of the inside pressure at 1.52 MPa. A solution of 0.04 g of ammonium persulfate in 4 ml of pure water was added with stirring at a rate of stirring of 600 r.p.m. to initiate the polymerization.

During polymerization, when the pressure fell to 1.422 MPa, a mixed gas composed of VDF/HFP=78/22 mole percent was fed under pressure to increase the pressure to 1.52 MPa. After three repetitions of this procedure, the temperature was lowered to 60° C., a mixed gas composed of VDF/HFP=78/22 mole percent was again fed under pressure to increase the pressure to 1.47 MPa. On that occasion, 6.81 g of a 40% (by mass) solution of diisopropyl peroxydicarbonate in $HCF_2CF_2CH_2OH$ was further injected under nitrogen pressure, and the polymerization was allowed to proceed. When the pressure fell to 1.422 MPa, a mixed gas composed of VDF/HFP=78/22 mole percent was fed under pressure to increase the pressure to 1.52 MPa. This procedure was repeated and, after arrival of the total mass of the monomers charged at 555 g, the monomer feeding was discontinued, the gaseous monomers in the polymerization vessel were blown off, the vessel was cooled, and the contents were taken out. The dispersion recovered weighed 2048.5 g and was white and semitransparent.

The dispersion obtained had a solid matter content of 26.41% by mass, and the fluorocopolymer particles had an average particle diameter of 150 nm. The comonomer composition of the fluorocopolymer was examined by NMR analysis and found to be VDF/HFP=78/22 mole percent. That portion of the polymer adhering to the agitating blade and so forth weighed 2.25 g (in a wet state). The above dispersion was subjected to coagulation with a 4% (by mass) solution of aluminum sulfate, followed by drying, which gave a rubber fluorocopolymer. This rubber fluorocopolymer had the Mooney viscosity, at 100° C., of $ML_{1+10}$ (100° C.)=57.3.

EXAMPLE 8

A 3000-ml horizontal autoclave was charged with 1000 ml of pure water, 0.1089 g of a 50% (by mass) aqueous solution of $CH_2$=$CFCF_2OCF(CF_3)CF_2OCF(CF_3)COONH_4$ and 4.0032 g of a 50% (by mass) aqueous solution of $C_5F_{11}COONH_4$, the autoclave inside was pressurized to 3.2 MPa with nitrogen and, after confirmation of there being no leakage, evacuated and then substituted with nitrogen; it was confirmed that the oxygen concentration was not higher than 1 ppm.

This vessel was evacuated and then pressurized to a slight extent with propylene gas, heated to 60° C. with stirring at 400 r.p.m. and further charged with propylene gas to a pressure of 0.511 MPa. Thereto was fed TFE gas increased in pressure by means of a compressor to raise the pressure to 2.70 MPa. A solution prepared by dissolving 1.6291 g of ammonium persulfate as a polymerization initiator in pure water to make a total weight of 11.7392 g and a solution prepared by dissolving 0.605 g of NaOH in pure water to make a total weight of 5.2051 g were fed thereto simultaneously under nitrogen pressure. Almost no pressure drop in the autoclave inside was observed.

Twenty minutes after addition of the polymerization initiator, the temperature was raised to 65° C., whereupon the pressure rose to a maximum of 2.77 MPa and, immediately thereafter, began to fall. The rate of pressure fall gradually rose and, 344 minutes after charging of the polymerization initiator, the pressure drop increased abruptly, so that the polymerization procedure was discontinued at 2.2 MPa (blowing out, cooling); 1035.4 g of a dispersion was recovered. The dispersion obtained had a solid matter content of 8.42% by mass. The fluorocopolymer particles had an average particle diameter of about 110 nm. The number of particles in the dispersion was about $7.6 \times 10^{13}$/ml. The dispersion was subjected to coagulation using a 4% (by mass) aqueous solution of aluminum sulfate and the coagula were dried at 80° C. for 8 hours and then at 120° C. for 12 hours; a rubbery fluffy dried solid was obtained. Elemental analysis revealed that the fluorocopolymer had a TFE content of 65 mole percent. Upon DSC measurement, the fluorocopolymer was found to have a glass transition temperature [Tg] of 2.6° C.

EXAMPLE 9

A 3.14-L stainless steel autoclave was charged with 1.716 L of pure water, 0.341 g of a 50% (by mass) aqueous solution of $CH_2$=$CFCF_2OCF(CF_3)CF_2OCF(CF_3)COONH_4$ and 1.363 g of a 50% (by mass) aqueous solution of $C_5F_{11}COONH_4$, and the system inside was sufficiently purged with nitrogen gas. After raising the temperature to 80° C. with stirring at 560 rpm, a monomer mixture consisting of VDF/TFE/HFP=7/5/88 mole percent was fed under pressure into the autoclave until a pressure of 3.5 MPa.

Then, a polymerization initiator solution prepared by dissolving 204 mg of APS in 5 ml of pure water was added under nitrogen gas pressure to initiate the polymerization.

At the time when the inside pressure began to fall with the progress of polymerization, a monomer mixture consisting of VDF/TFE/HFP=67/25/8 mole percent was fed under pressure until arrival of the inside pressure at 3.5 MPa. On that occasion, 2.06 g of a diiodinated compound, $I(CF_2)_4I$, was injected. Then, after addition of 190 g of the monomer mixture, 2.59 g of an iodine-containing fluorinated vinyl ether, $CF_2$=$CFOCF_2CF_2CH_2I$, was injected. After addition of a total of 383 g of the monomer mixture, the unreacted monomers were discharged, the autoclave was cooled, and a dispersion with a solid matter concentration of 27.7% by mass was obtained. The fluorocopolymer particles had an average particle diameter of 132 nm. The copolymer composition was examined by NMR analysis and found to be VDF/TFE/HFP=49/21/30 (mole percent), and the number of particles in the dispersion was $1.7 \times 10^{14}$ (particles/g of water). An attempt was made to recover the portion of the fluorocopolymer adhering to the autoclave inside but such portion was too small to be recovered.

EXAMPLE 10

A 3.14-L stainless steel autoclave was charged with 1.716 L of pure water, 0.341 g of a 50% (by mass) aqueous solution of $CH_2$=$CFCF_{20}CF(CF_3)CF_{20}CF(CF_3)COONH_4$ and 1.363 g of a 50% (by mass) aqueous solution of $C_5F_{11}COONH_4$, and the system inside was sufficiently purged with nitrogen gas. After raising the temperature to 80° C. with stirring at 560 rpm, a monomer mixture consisting of VDF/TFE/HFP=32/5/63 mole percent was fed under pressure into the autoclave until a pressure of 4.2 MPa.

Then, a polymerization initiator solution prepared by dissolving 255 mg of APS in 5 ml of pure and 10.7 g of diethyl malonate were added under nitrogen gas pressure to initiate the reaction.

At the time when the inside pressure began to fall with the progress of polymerization, a monomer mixture consisting of VDF/TFE/HFP=68/23/9 mole percent was fed under pressure until arrival of the inside pressure at 4.2 MPa. After addition of 280 g of the monomer mixture, the unreacted monomers were discharged, the autoclave was cooled, and a dispersion with a solid matter concentration of 25.9% by mass was obtained. The fluorocopolymer particles had an average particle diameter of 119 nm. The copolymer composition was examined by NMR analysis and found to be VDF/TFE/HFP=61/21/18 (mole percent), and the number of particles in the dispersion was $2.2 \times 10^{14}$ (particles/g of water). An attempt was made to recover the portion of the fluorocopolymer adhering to the autoclave inside but such portion was too small to be recovered.

The above dispersion was subjected to coagulation by addition of a 4% (by mass) aqueous solution of aluminum sulfate. The coagula obtained were washed with water and dried to give a rubbery fluorocopolymer. The Mooney viscosity thereof was $ML_{1+10}$ (100° C.)=56/

COMPARATIVE EXAMPLE 1

A 3-L stainless steel autoclave was charged with 0.99 L of pure water, 0.2 g of a 50% (by mass) aqueous solution of $CH_2$=$CFCF_2CF(CF_3)OCF_2CF_2COONH_4$ (emulsifier A), and the system inside was sufficiently purged with nitrogen gas. After raising the temperature to 80° C. with stirring at 600 rpm, a monomer mixture consisting of VDF/TFE/HFP=19/11/70 mole percent was fed under pressure into the autoclave until arrival of the pressure at 1.52 MPa. Then, a polymerization initiator solution prepared by dissolving 23.6 mg of APS in 5 ml of pure water was added under nitrogen gas pressure to initiate the reaction.

With the progress of polymerization, the inside pressure fell to 1.42 MPa. At that time, a monomer mixture consisting of VDF/TFE/HFP=51/20/29 mole percent was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, an aqueous solution of 23.6 mg of APS in 5 ml of pure water was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 22.0% by mass was obtained. The polymerization time was 13.3 hours in total. The fluorocopolymer particles had an average particle diameter of 101 nm. The copolymer composition was examined by NMR analysis and found to be VDF/TFE/HFP=53/23/24 (mole percent), and the number of particles in the dispersion was $3.4 \times 10^{14}$ (particles/g of water).

That portion of the fluorocopolymer adhering to the autoclave inside was recovered and dried at 120° C. for 8 hours; the residue weighed 33.6 g.

This dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.21% by mass, and the Mooney viscosity was $ML_{1+10}$ (100° C.)=51.

The above rubbery fluorocopolymer (100 phr) was kneaded with 20 phr of N990, 4 phr of TAIC and 1.5 phr of Perhexa 25B on a mixing roll mill to give a curable composition. The curing characteristics of the curable composition obtained and the physical characteristics of the curing product obtained by press curing and further oven curing were as shown in Table 3.

COMPARATIVE EXAMPLE 2

A 3-L stainless steel autoclave was charged with 0.99 L of pure water, 1.54 g of a 50% (by mass) aqueous solution of $F(CF_2)_5COONH_4$, and the system inside was sufficiently purged with nitrogen gas. After raising the temperature to 80° C. with stirring at 600 rpm, a monomer mixture consisting of VDF/TFE/HFP 19/11/70 mole percent was fed under pressure into the autoclave until arrival of the pressure at 1.52 MPa. Then, a polymerization initiator solution prepared by dissolving 23.6 mg of APS in 5 ml of pure water was added under nitrogen gas pressure to initiate the reaction.

With the progress of polymerization, the inside pressure fell to 1.42 MPa. At that time, a monomer mixture consisting of VDF/TFE/HFP (=51/20/29 mole percent) was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, an aqueous solution of 23.6 mg of APS in 5 ml of pure water was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 22.8% by mass was obtained. The fluorocopolymer particles had an average particle diameter of 381 nm. The copolymer composition was examined by NMR analysis and found to be VDF/TFE/HFP=52/22/26 (mole percent), and the number of particles in the dispersion was $5.4 \times 10^{12}$ (particles/g of water). That portion of the fluorocopolymer adhering to the autoclave inside was recovered and dried at 120° C. for 8 hours; the residue weighed 2.3 g.

This dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.22% by mass, and the Mooney viscosity was $ML_{1+10}$ (100° C.)=53.

The above rubbery fluorocopolymer (100 phr) was kneaded with 20 phr of N990, 4 phr of TAIC and 1.5 phr of Perhexa 25B on a mixing roll mill to give a curable composition. The curing characteristics of the curable composition obtained and the physical characteristics of the curing product obtained by press curing and further oven curing were as shown in Table 3.

COMPARATIVE EXAMPLE 3

A 3.14-L stainless steel autoclave was charged with 1.716 L of pure water, 0.0343 g of a 50% aqueous solution of emulsifier A, and the system inside was sufficiently purged with nitrogen gas. After raising the temperature to 80° C. with stirring at 560 rpm, a monomer mixture consisting of VDF/HFP=42/58 mole percent was fed under pressure into the autoclave until arrival of the pressure at 6 MPa. Then, a polymerization initiator solution prepared by dissolving 0.257 g of APS in 5 ml of pure water and 9.95 g of diethyl malonate were added under nitrogen gas pressure to initiate the reaction.

At the time when the inside pressure began to fall with the progress of polymerization, a monomer mixture consisting of VDF/HFP=78/22 mole percent was fed under pressure until arrival of the inside pressure at 6 MPa. After addition of 470 g of the monomer mixture, the unreacted monomers were discharged, the autoclave was cooled, and a dispersion with a solid matter concentration of 25.0% by mass was obtained. The fluorocopolymer particles had an average particle diameter of 220 nm. The copolymer composition was examined by NMR analysis and found to be VDF/HFP=77/23 (mole percent), and the number of particles in the dispersion was $4.8 \times 10^{13}$ (particles/g of water). That portion of the fluorocopolymer adhering to the autoclave inside was recovered and dried at 120° C. for 8 hours; the residue weighed 20.0 g.

This dispersion was subjected to coagulation by addition of a 4% (by mass) aqueous solution of aluminum sulfate. The coagula obtained were washed with water and dried to give a rubbery fluorocopolymer. The Mooney viscosity thereof was $ML_{1+10}$ (100° C.)=43.

The above rubbery fluorocopolymer (100 phr) was kneaded with 20 phr of N990, 2.17 phr of bisphenol AF, 0.43 phr of benzyltriphenylphosphonium chloride (BTPPC), 3 phr of magnesium oxide (MA-150) and 6 phr of calcium hydroxide (Caldic 2000) on a mixing roll mill to give a curable composition. The curing characteristics of the curable composition obtained and the physical characteristics of the curing product obtained by press curing and further oven curing were as shown in Table 3.

COMPARATIVE EXAMPLE 4

A 3-L stainless steel autoclave was charged with 0.99 L of pure water, 2.0 g of a 50% aqueous solution of $F(CF_2)_7COONH_4$, and the system inside was sufficiently purged with nitrogen gas. After raising the temperature to 80° C. with stirring at 600 rpm, a monomer composition consisting of VDF/TFE/HFP=19/11/70 mole percent was fed into the autoclave under pressure until arrival of the pressure at 1.52 MPa. Then, a polymerization initiator solution prepared by dissolving 23.6 mg of APS in 5 ml of pure water was fed under nitrogen gas pressure to initiate the reaction.

With the progress of polymerization, the inside pressure fell to 1.42 MPa. At that time, a monomer mixture consisting of VDF/TFE/HFP=51/20/29 mole percent was fed under pressure until arrival of the inside pressure at 1.52 MPa. On that occasion, 1.531 g of a diiodinated compound, $I(CF_2)_4I$, was injected into the autoclave. While such pressurization followed by pressure drop was repeated, an aqueous solution of 23.6 mg of APS in 5 ml of pure water was fed under nitrogen gas pressure at 3-hour intervals and the polymerization reaction was thus continued. After addition of a total of 333 g of the monomer mixture, the unreacted monomers were discharged, the autoclave was cooled, and a dispersion with a solid matter concentration of 23.8% by mass was obtained. The fluorocopolymer particles had an average particle diameter of 142 nm. The copolymer composition was examined by NMR analysis and found to be VDF/TFE/HFP=52/22/26 (mole percent), and the number of particles in the dispersion was $1.1 \times 10^{14}$ (particles/g of water).

An attempt was made to recover the portion of the fluorocopolymer adhering to the autoclave inside but such portion was too small to be recovered.

The above dispersion was subjected to coagulation by addition of a 4% (by mass) aqueous solution of aluminum sulfate. The coagula obtained were washed with water and dried to give a rubbery fluorocopolymer. The content of iodine in the rubbery fluorocopolymer was 0.24% by mass, and the Mooney viscosity was $ML_{1+10}$ (100° C.)=60.

The above rubbery fluorocopolymer (100 phr) was kneaded with 20 phr of N990, 4 phr of TAIC and 1.5 phr of Perhexa 25B on a mixing roll mill to give a curable composition. The curing characteristics of the curable composition obtained and the physical characteristics of the curing product obtained by press curing and further oven curing were as shown in Table 3.

COMPARATIVE EXAMPLE 5

The polymerization procedure of Example 7 was followed in the same manner except that $CH_2=CFCF_2OCF(CF_3)$ $CF_2OCF(CF_3)COONH_4$ was not used at all. At the time of arrival of the amount of the additional monomer mixture at 525 g, the agitating blade showed an abnormality, so that the polymerization was discontinued and 1883.8 g of a milk white dispersion was recovered. The solid matter content of the dispersion was only 23.11% by mass. The fluorocopolymer particles obtained had an average particle diameter of 460 nm. Large polymer lumps remained in the polymerization vessel and the total mass thereof amounted to 123.1 g (in a wet state). The comonomer composition of the fluorocopolymer obtained was examined by NMR analysis and found to be VDF/HFP=78/22 (mole percent). The above dispersion was subjected to coagulation by addition of a 4% (by mass) solution of aluminum sulfate and the coagula were dried to give a rubbery fluorocopolymer. The rubbery fluorocopolymer had the Mooney viscosity of $ML_{1+10}$ (100° C.)=65.3.

TABLE 1

| | | | Example 1 | Example 2 | Example 3 | Example 4 | Example 5 | Example 6 |
|---|---|---|---|---|---|---|---|---|
| polymerization condition | polymerization vessel(made of SUS) (L) | | 3 | 3 | 3 | 3.14 | 3.14 | 3 |
| | polymerization pressure (MPa) | | 1.52 | 1.52 | 1.52 | 6.0 | 6.0 | 1.52 |
| | Polymerization temperature (° C.) | | 80 | 80 | 80 | 80 | 80 | 80 |
| | Rate of stirring (rpm) | | 600 | 600 | 600 | 560 | 560 | 560 |
| | Pure water (L) | | 0.99 | 0.99 | 0.99 | 1.716 | 1.716 | 1.48 |
| | Emulsifier species and addition level (50% aqueous solution) (g) | $CH_2=CFCF_2CF(CF_3)OCF_2CF_2COONH_4$ | 0.2 | 0.2 | 0.2 | 0.0343 | — | 0.15 |
| | | $CH_2=CFCF_2OCF(CF_3)CF_2OCF(CF_3)COONH_4$ | — | — | — | — | — | — |
| | | $F(CF_2)_5COONH_4$ | 1.54 | — | — | 1.386 | 1.386 | 6.0 |
| | | $F(CF_2)_3COONH_4$ | — | 1.07 | — | — | — | — |
| | | $F(CF_2)_6CH_2CH_2SO_3NH_4$ | — | — | 2.06 | — | — | — |
| | | $CH_3(CH_2)mCH(SO_3Na)(CH_2)nCH_3$ (m + n = 10~14) | — | — | — | — | 0.0343 | — |
| | | $F(CF_2)_7COONH_4$ | — | — | — | — | — | — |
| | Initial monomer composition (mol %) | VdF/TFE/HFP | 19/11/70 | 19/11/70 | 19/11/70 | 42/0/58 | 42/0/58 | — |
| | | VdF/TFE/PMVE | — | — | — | — | — | 64/8/28 |
| | | TFE/Pr | — | — | — | — | — | — |
| | Succeeding monomer compositon (mol %) | VdF/TFE/HFP | 51/20/29 | 51/20/29 | 51/20/29 | 78/0/22 | 78/0/22 | — |
| | | VdF/TFE/PMVE | — | — | — | — | — | 69/11/20 |
| | Polymerization initiator (mg) | APS | Initial | 23.6 | 23.6 | 23.6 | 257 | 257 | 22.5 |
| | | | Added (at 3-hour intervals) | 23.6 × twice | 23.6 × twice | 23.6 × twice | — | — | 11.0 × once |
| | | Diisopropyl peroxydicarbonate, 40% (by mass) solution in $HCF_2CF_2CH_2OH$ | added | — | — | — | — | — | — |
| | Chain transfer agent (g) | $I(CF_2)_4I$ | | 1.531 | 1.531 | 1.531 | — | — | 1.616 |
| | | Diethyl malonate | | — | — | — | 9.95 | 9.95 | — |
| | | Iodine-containing fluorinated vinyl ether (g) | $CF_2=CFOCF_2CF_2CH_2I$ | — | — | — | — | — | 3.312 |

TABLE 1-continued

| polymerization results | | | | | | | |
|---|---|---|---|---|---|---|---|
| | Polymerization time (hrs) | 6.4 | 6.8 | 7.3 | 3.5 | 4.3 | 9.5 |
| | Succeeding monomer charge (weighed value) | 333 | 333 | 333 | 470 | 470 | 540 |
| | Dispersion amount (g) | 1405 | 1381 | 1393 | 2402 | 2345 | 2100 |
| | Solid matter concentration (% by mass) | 22.6 | 23.4 | 22.2 | 27.1 | 26.1 | 26.2 |
| | Polymer yield (g) | 318 | 323 | 309 | 651 | 611 | 550 |
| | Adhering matter amount (after drying) | ≈0 | 2.4 | ≈0 | 3.6 | 3.7 | ≈0 |
| | VdF/TFE/HFP(mol %) | 52/22/26 | 52/22/26 | 53/23/24 | 78/0/24 | 78/0/22 | — |
| | VdF/TFE/PMVE(mol %) | — | — | — | — | — | 67/14/19 |
| | TFE/Pr (mol %) | — | — | — | — | — | — |
| | $ML_{1+10}(100°\,C.)$ | 53 | 64 | 50 | 49 | 51 | 59 |
| | Iodine content in polymer (% by mass) | 0.22 | 0.20 | 0.26 | — | — | 0.33 |
| | Dispersed particle diameter (nm) | 100 | 129 | 117 | 192 | 334 | 160 |
| | Number of particles (particles/g of water) | $3.4 \times 10^{14}$ | $1.7 \times 10^{14}$ | $2.3 \times 10^{14}$ | $5.6 \times 10^{13}$ | $1.0 \times 10^{13}$ | $9.2 \times 10^{13}$ |

| | | | Example 6 | Example 7 | Example 8 | Example 9 | Example 10 |
|---|---|---|---|---|---|---|---|
| polymerization condition | polymerization vessel(made of SUS) (L) | | 3 | 3 | 3 | 3.14 | 3.14 |
| | polymerization pressure (MPa) | | 1.52 | 1.52 | 2.7 | 3.5 | 4.2 |
| | Polymerization temperature (° C.) | | 80 | 80 | 60[Note 1] | 80 | 80 |
| | Rate of stirring (rpm) | | 560 | 600 | 400 | 560 | 560 |
| | Pure water (L) | | 1.48 | 1.530 | 1 | 1.7 | 1.7 |
| | Emulsifier species and addition aqueous level (50% solution) (g) | $CH_2=CFCF_2CF(CF_3)OCF_2CF_2COONH_4$ | 0.15 | — | — | — | — |
| | | $CH_2=CFCF_2OCF(CF_3)CF_2OCF(CF_3)COONH_4$ | — | 0.153 | 0.1089 | 0.341 | 0.341 |
| | | $F(CF_2)_5COONH_4$ | 6.0 | 3.06 | 4.0032 | 1.363 | 1.363 |
| | | $F(CF_2)_3COONH_4$ | — | — | — | — | — |
| | | $F(CF_2)_6CH_2CH_2SO_3NH_4$ | — | — | — | — | — |
| | | $CH_3(CH_2)mCH(SO_3Na)(CH_2)nCH_3(m+n=10\sim14)$ | — | — | — | — | — |
| | | $F(CF_2)_7COONH_4$ | — | — | — | — | — |
| | Initial monomer composition (mol %) | VdF/TFE/HFP | — | 65/0/35 | — | 7/5/88 | 32/5/63 |
| | | VdF/TFE/PMVE | 64/8/28 | — | — | — | — |
| | | TFE/Pr | — | — | 63/17 | — | — |
| | Succeeding monomer compositon (mol %) | VdF/TFE/HFP | — | 78/0/22 | — | 67/25/8 | 68/23/9 |
| | | VdF/TFE/PMVE | 69/11/20 | — | — | — | — |
| | Polymerization initiator (mg) | APS | Initial | 22.5 | 40 | 1629.1[Note 2] | 204 | 255 |
| | | | Added (at 3-hour intervals) | 11.0 × once added | — | — | — | — |
| | | Diisopropyl peroxydicarbonate, 40% (by mass) solution in $HCF_2CF_2CH_2OH$ | | — | 6.81 | — | — | — |
| | Chain transfer agent (g) | $I(CF_2)_4I$ | | 1.616 | — | — | 2.06 | — |
| | | Diethyl malonate | | — | — | — | — | 10.7 |
| | Iodine-containing fluorinated vinyl ether (g) | $CF_2=CFOCF_2CF_2CH_2I$ | | 3.312 | — | — | 2.59 | — |
| polymerization results | Polymerization time (hrs) | | 9.5 | 6.2 | 5.73 | 4.6 | 2.5 |
| | Succeeding monomer charge (weighed value) | | 540 | 555 | — | 383 | 280 |
| | Dispersion amount (g) | | 2100 | 2048.5 | 1035.4 | 2428 | 1395 |
| | Solid matter concentration (% by mass) | | 26.2 | 26.41 | 8.42 | 27.7 | 25.9 |
| | Polymer yield (g) | | 550 | — | — | 670 | 360 |
| | Adhering matter amount (after drying) | | ≈0 | 2.25 | — | ≈0 | ≈0 |
| | VdF/TFE/HFP(mol %) | | — | 78/0/22 | — | 49/21/30 | 61/21/18 |
| | VdF/TFE/PMVE(mol %) | | 67/14/19 | — | — | — | — |
| | TFE/Pr (mol %) | | — | — | 65/35 | — | — |
| | $ML_{1+10}(100°\,C.)$ | | 59 | 57.3 | — | 92 | 56 |
| | Iodine content in polymer (% by mass) | | 0.33 | — | — | 0.26 | — |
| | Dispersed particle diameter (nm) | | 160 | 150 | 110 | 132 | 119 |
| | Number of particles (particles/g of water) | | $9.2 \times 10^{13}$ | — | $7.6 \times 10^{13}$ | $1.7 \times 10^{14}$ | $2.2 \times 10^{14}$ |

[Note 1] Temperature at start of polymerization; after 20 minutes from the start, the temperature was raised to 65° C.

[Note 2] A solution of 0.605 g of NaOH in 5.2051 g of pure water was also injected under pressure.

TABLE 2

|  |  |  | Comparative Example 1 | Comparative Example 2 | Comparative Example 3 | Comparative Example 4 | Comparative Example 5 |
|---|---|---|---|---|---|---|---|
| polymerization condition | polymerization vessel(made of SUS) (L) |  | 3 | 3 | 3.14 | 3 | 3 |
|  | polymerization pressure (MPa) |  | 1.52 | 1.52 | 6 | 1.52 | 1.52 |
|  | Polymerization temperature (° C.) |  | 80 | 80 | 80 | 80 | 80 |
|  | Rate of stirring (rpm) |  | 600 | 600 | 560 | 600 | 600 |
|  | Pure water (L) |  | 0.99 | 0.99 | 1.716 | 0.99 | 1.530 |
|  | Emulsifier species and addition level (50% aqueous solution) (g) | $CH_2=CFCF_2CF(CF_3)OCF_2CF_2COONH_4$ | 0.2 | — | 0.0343 | — | — |
|  |  | $CH_2=CFCF_2OCF(CF_3)CF_2OCF(CF_3)COONH_4$ | — | — | — | — | — |
|  |  | $F(CF_2)_5COONH_4$ | — | 1.54 | — | — | 3.06 |
|  |  | $F(CF_2)_3COONH_4$ | — | — | — | — | — |
|  |  | $F(CF_2)_5CH_2CH_2SO_3NH_4$ | — | — | — | — | — |
|  |  | $CH_3(CH_2)mCH(SO_3Na)(CH_2)nCH_3(m+n=10\sim14)$ | — | — | — | — | — |
|  |  | $F(CF_2)_7COONH_4$ | — | — | — | 2.0 | — |
|  | Initial monomer composition (mol %) | VdF/TFE/HFP | 19/11/70 | 19/11/70 | 42/0/58 | 19/11/70 | 65/0/35 |
|  |  | VdF/TFE/PMVE | — | — | — | — | — |
|  |  | TFE/Pr | — | — | — | — | — |
|  | Succeeding monomer composition (mol %) | VdF/TFE/HFP | 51/20/29 | 51/20/29 | 78/0/22 | 51/20/29 | 78/0/22 |
|  |  | VdF/TFE/PMVE | — | — | — | — | — |
|  | Polymerization initiator (mg) | APS | Initial | 23.6 | 23.6 | 257 | 23.6 | 40 |
|  |  |  | Added (at 3-hour intervals) | 23.6 × twice | 23.6 × 4 times | — | 23.6 × 3 times | — |
|  |  | Diisopropyl peroxydicarbonate, 40% (by mass) solution in $HCF_2CF_2CH_2OH$ | added | — | — | — | — | 6.81 |
|  | Chain transfer agent (g) | $I(CF_2)_4I$ |  | 1.531 | 1.531 | — | 1.531 | — |
|  |  | Diethyl malonate |  | — | — | 9.95 | — | — |
|  | Iodine-containing fluorinated vinyl ether (g) | $CF_2=CFOCF_2CF_2CH_2I$ |  | — | — | — | — | — |
| polymerization results | Polymerization time (hrs) |  | 6.5 | 13.3 | 3.4 | 7.4 | — |
|  | Succeeding monomer charge (weighed value) |  | 333 | 333 | 470 | 333 | 525 |
|  | Dispersion amount (g) |  | 1280 | 1372 | 2389 | 1360 | 1883.8 |
|  | Solid matter concentration (% by mass) |  | 22.0 | 22.8 | 25 | 23.8 | 23.11 |
|  | Polymer yield (g) |  | 281 | 313 | 597 | 324 | 123.1 |
|  | Adhering matter amount (after drying) |  | 33.6 | 2.3 | 20 | ≈0 | — |
|  | VdF/TFE/HFP(mol %) |  | 53/23/24 | 52/22/26 | 77/0/23 | 52/22/26 | 78/0/22 |
|  | VdF/TFE/PMVE(mol %) |  | — | — | — | — | — |
|  | $ML_{1+10}(100°\ C.)$ |  | 51 | 53 | 43 | 60 | 65.3 |
|  | Iodine content in polymer (% by mass) |  | 0.21 | 0.22 | — | 0.24 | — |
|  | Dispersed particlediameter (nm) |  | 101 | 381 | 220 | 142 | 460 |
|  | Number of particles (particles/g of water) |  | $3.4 \times 10^{14}$ | $5.4 \times 10^{12}$ | $4.8 \times 10^{13}$ | $1.1 \times 10^{14}$ | — |

TABLE 3

|  |  | Example 1 | Example 2 | Example 3 | Example 4 | Example 5 | Example 6 |
|---|---|---|---|---|---|---|---|
| Formulation | Polymer (phr) | 100 | 100 | 100 | 100 | 100 | 100 |
|  | N990 (phr) | 20 | 20 | 20 | 20 | 20 | 20 |
|  | TAIC (phr) | 4 | 4 | 4 | — | — | 3 |
|  | Perhexa25B (phr) | 1.5 | 1.5 | 1.5 | — | — | 1.5 |
|  | Bis-AF (phr) | — | — | — | 2.17 | 2.17 | — |
|  | BTPPC (phr) | — | — | — | 0.43 | 0.43 | — |
|  | MA-150 (phr) | — | — | — | 3 | 3 | — |
|  | Caldic2000 (phr) | — | — | — | 6 | 6 | — |
| Curing characteristics, JSR Curastometer type V Curing temperature (° C.) | Curing tempreature (° C.) | 160 | 160 | 160 | 170 | 170 | 160 |
|  | ML (Kgf*cm) | 0.55 | 0.58 | 0.5 | 0.84 | 0.86 | 0.88 |
|  | MH (Kgf*cm) | 20.13 | 20.30 | 21.41 | 17.74 | 17.80 | 21.13 |
|  | Cure rate $T_{10}$ (min) | 1.32 | 1.42 | 1.35 | 4.30 | 4.20 | 1.01 |
|  | Cure rate $T_{90}$ (min) | 3.18 | 3.31 | 3.28 | 5.30 | 5.20 | 2.85 |
| Curing condition | Press Cure (° C. × min) | 160 × 10 | 160 × 10 | 160 × 10 | 170 × 10 | 170 × 10 | 160 × 10 |
|  | Oven Cure (° C. × hrs) | 180 × 4 | 180 × 4 | 180 × 4 | 230 × 24 | 230 × 24 | 180 × 4 |

TABLE 3-continued

| | | | | | | | |
|---|---|---|---|---|---|---|---|
| Mechanical properties | Tensile stress $M_{100}$ (MPa) | 3.0 | 3.0 | 2.9 | 4.8 | 4.8 | 3.5 |
| | TB (tensile strength) (MPa) | 19.7 | 21.0 | 22.2 | 13.3 | 14.2 | 15.5 |
| | EB (elongation) (%) | 285 | 300 | 300 | 220 | 237 | 200 |
| | Hardness (Peak) | 70.6 | 70.1 | 69.9 | 74.1 | 74.5 | 66.0 |
| | Hardness (after 1 second) | 68.0 | 67.7 | 67.9 | 72.5 | 71.1 | 64.0 |
| Permanent compression set (P24 O ring) (%) (200° C. × 72 hours) | | 26.1 | 23.7 | 23.2 | 13.9 | 12.4 | 15.9 |

| | | | Comparative Example 1 | Comparative Example 2 | Comparative Example 3 | Comparative Example 4 |
|---|---|---|---|---|---|---|
| Formulation | | Polymer (phr) | 100 | 100 | 100 | 100 |
| | | N990 (phr) | 20 | 20 | 20 | 20 |
| | | TAIC (phr) | 4 | 4 | — | 4 |
| | | Perhexa25B (phr) | 1.5 | 1.5 | — | 1.5 |
| | | Bis-AF (phr) | — | — | 2.17 | — |
| | | BTPPC (phr) | — | — | 0.43 | — |
| | | MA-150 (phr) | — | — | 3 | — |
| | | Caldic2000 (phr) | — | — | 6 | — |
| Curing characteristics, JSR Curastometer type V Curing temperature (° C.) | | Curing temprerature (° C.) | 160 | 160 | 170 | 160 |
| | | ML (Kgf*cm) | 0.54 | 0.53 | 0.88 | 0.52 |
| | | MH (Kgf*cm) | 20.33 | 20.49 | 17.59 | 20.11 |
| | | Cure rate $T_{10}$ (min) | 1.34 | 1.35 | 4.50 | 1.33 |
| | | Cure rate $T_{90}$ (min) | 3.10 | 3.09 | 5.60 | 3.27 |
| Curing condition | | Press Cure (° C. × min) | 160 × 10 | 160 × 10 | 170 × 10 | 160 × 10 |
| | | Oven Cure (° C. × hrs) | 180 × 4 | 180 × 4 | 230 × 24 | 180 × 4 |
| Mechanical properties | | Tensile stress $M_{100}$ (MPa) | 3.2 | 3.4 | 4.8 | 2.9 |
| | | TB (tensile strength) (MPa) | 19.5 | 19.2 | 12.4 | 20.5 |
| | | EB (elongation) (%) | 288 | 285 | 212 | 298 |
| | | Hardness (Peak) | 70.7 | 72.0 | 73.4 | 70.2 |
| | | Hardness (after 1 second) | 68.5 | 70.0 | 72.1 | 68.3 |
| Permanent compression set (P24 O ring) (%) (200° C. × 72 hours) | | | 24.5 | 27.0 | 12.7 | 24.4 |

The results shown above revealed that, in each of the Examples, the amount of that portion of the fluorocopolymer adhering to the autoclave inside was small, the aqueous fluoroelastomer dispersion obtained contained at least $1.0 \times 10^{13}$ particles per gram of water whereas, in Comparative Example 1, in which the emulsifier A alone was used as an emulsifier, the amount of the fluorocopolymer adhering to the polymerization vessel was great although the number of polymer particles in the aqueous fluoroelastomer dispersion obtained was $3.4 \times 10^{14}$/gram of water. In Comparative Example 2 in which $F(CF_2)_5COONH_4$ alone was used as an emulsifier, the total reaction time amounted to 13 hours, namely more than twice as compared with Example 1 and, although the amount of the fluorocopolymer adhering to the autoclave inside was 2.3 g, the number of polymer particles in the aqueous fluoroelastomer dispersion obtained was as small as $5.4 \times 10^{12}$/gram of water. In Example 1, good productivity was achieved using only 0.1 g of the emulsifier A whereas, in Comparative Example 4, 1.0 g of $F(CF_2)_7COONH_4$ was required. Further, it was found that the curable composition obtained in each of the Examples showed good curing characteristics, as in the Comparative Examples.

INDUSTRIAL APPLICABILITY

The method of producing a fluoroelastomer according to the invention, which has the constitution described hereinabove, can produce the fluoroelastomer excellent in dispersion stability at low cost, at a high rate of polymerization and in high yields. The fluoroelastomer molding, which are obtained from the above-mentioned fluoroelastomer, are low in permanent compression set, excellent in mechanical strength, suited for use as seals, electric wire coverings, tubes and laminates and particularly suited for use as semiconductor manufacturing apparatus parts, automotive parts and the like.

The invention claimed is:

1. A method of producing a fluoroelastomer comprising an emulsion polymerization of a fluorinated monomer in the presence of a water-soluble radical polymerization initiator,
    wherein the emulsion polymerization is carried out in the presence of a compound (1) containing a functional group reactive in radical polymerization and a hydrophilic group and
    a fluorinated compound (2) containing a fluorocarbon group comprising 1 to 6 continuously united carbon atoms with fluorine atom directly bound to each of them as well as a hydrophilic group,
    the compound (1) is a perfluoroallyl ether compounds represented by formula (1e):

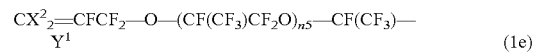

$$CX^2{}_2=\!\!CFCF_2\!\!-\!\!O\!\!-\!\!(CF(CF_3)CF_2O)_{n5}\!\!-\!\!CF(CF_3)\!\!-\!\!Y^1 \quad (1e)$$

wherein the two atoms of $X^2$ are the same and each represents F or H, $n_5$ represents an integer 0 or 1 to 10 and $Y^1$ represents $-SO_3M^1$ or $-COOM^1$,
    the compound (2) is a perfluoroalkyl compounds represented by the formula (2b):

$$CF_3\!-\!(CF_2)_{n7}\!-\!Y^5 \quad (2b)$$

wherein $n_7$ represents an integer of 1 to 5 and $Y^5$ represents $-SO_3M^3$ or $-COOM^3$; $M^3$ represents H, $NH_4$ or an alkali metal,
    the fluoroelastomer is vinylidene fluoride/hexafluoropropylene copolymer, vinylidene fluoride/tetrafluoroethylene/hexafluoropropylene copolymer or vinylidene fluoride/tetrafluoroethylene/perfluoro(alkyl vinyl ether) copolymer, and
    the water-soluble radical polymerization initiator is water-soluble inorganic compound or water-soluble organic compound peroxides.

2. The method of producing a fluoroelastomer according to claim 1,
wherein the compound (1) is used in an amount corresponding to 10 to 200 ppm of an aqueous medium.

3. The method of producing a fluoroelastomer according to claim 1,
wherein the fluorinated compound (2) is used in an amount corresponding to 200 to 5000ppm of an aqueous medium.

4. The method of producing a fluoroelastomer according to claim 1,
wherein $M^3$ represents $NH_4$.

* * * * *